United States Patent [19]

Aizawa et al.

[11] Patent Number: 5,035,519

[45] Date of Patent: Jul. 30, 1991

[54] SUBMERSIBLE THRUST BEARING APPARATUS

[75] Inventors: Kooji Aizawa; Katsutoshi Nii, both of Hitachi; Kazuhiko Kawaike, Katsuta; Kengo Hasegawa, Sakura; Akira Saruta, Chiba; Ryoichi Nakashima, Funabashi, all of Japan

[73] Assignee: Hitachi, Ltd., Tokyo, Japan

[21] Appl. No.: 488,948

[22] Filed: Mar. 5, 1990

Related U.S. Application Data

[63] Continuation of Ser. No. 250,507, Sep. 29, 1988, abandoned.

[30] Foreign Application Priority Data

Feb. 2, 1987 [JP] Japan .................. 62-249148

[51] Int. Cl.$^5$ ............. F16C 32/06; F16C 27/08; F16C 17/04; F16C 33/10
[52] U.S. Cl. ................... 384/121; 384/124; 384/224; 384/303; 384/368
[58] Field of Search ............ 384/100, 105, 121-124, 384/97, 223, 224, 240, 243, 303, 305-308, 312, 368, 420, 425

[56] References Cited

U.S. PATENT DOCUMENTS

| | | | |
|---|---|---|---|
| 1,457,081 | 5/1923 | Lieber | 384/303 X |
| 1,684,693 | 9/1928 | Böhm | 384/224 |
| 2,126,688 | 8/1938 | Palmgren | 384/303 |
| 2,380,179 | 7/1945 | Huber | 384/306 |
| 2,424,028 | 7/1947 | Haeberlein | 384/223 |
| 2,577,798 | 12/1951 | Neubauer | 384/224 |
| 3,565,498 | 2/1971 | Leopard et al. | 384/303 |
| 4,639,146 | 1/1987 | Yoshioka et al. | 384/224 X |

FOREIGN PATENT DOCUMENTS

545291  5/1942  United Kingdom .......... 384/307

*Primary Examiner*—Thomas R. Hannon
*Attorney, Agent, or Firm*—Antonelli, Terry, Stout & Kraus

[57] ABSTRACT

A thrust bearing including a ring-like form plate body, and a plurality of rib members provided on the ring-like form plate body of the thrust bearing. Such a plurality of rib members may be provided on a thrust runner. The rib members cause a difference in load deformation amount in a circumferential direction according to thrust load and generate a wedge-shaped form clearance between a sliding face of the thrust bearing and a sliding face of the thrust runner. Since the wedge-shaped form clearance is formed by utilizing the load deformation, even when the thrust load becomes large, the wedge-shaped form clearance does not become narrow. The occurrence of dynamic pressure by the wedge effect and the formation of a water film can be assured, and the temperature increase between the sliding face of the thrust runner and the sliding face of the thrust bearing can be restrained.

8 Claims, 5 Drawing Sheets

SUBMERSIBLE THRUST BEARING APPARATUS

This is a continuation of application Ser. No. 250,507, filed Sept. 29, 1988, now abandoned.

BACKGROUND OF THE INVENTION

The present invention relates to a submersible thrust bearing apparatus and, more particularly, to a thrust bearing portion in a submersible thrust bearing apparatus of a vertical type submersible motor for use in a submersible well pump.

The present invention relates to a submersible thrust bearing apparatus in which an improved thrust bearing is mounted to between a ring-like form thrust runner and a thrust frame of the submersible thrust bearing apparatus or an improved thrust bearing and an improved thrust frame of the submersible thrust bearing apparatus.

A conventional submersible thrust bearing apparatus is disclosed, in, for example, Japanese Patent Laid-Open No. 4920/1987, in which a tilting pad type thrust bearing apparatus is used.

Figure 12:
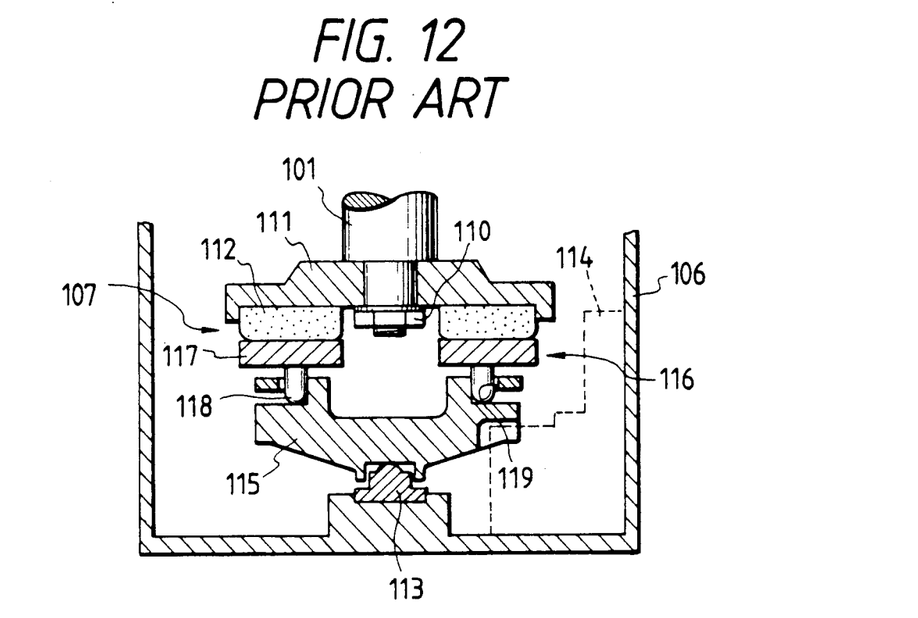
FIG. 12 is a cross-sectional view of a conventional submersible thrust bearing apparatus.

This conventional tilting pad type submersible thrust bearing apparatus 107 includes, as shown in FIG. 12, a shaft collar 111 fixed to a rotative shaft 101 with a hexagonal nut 110, and a ring-like form thrust runner 112 inserted in the shaft collar 111. A bearing frame 115 is positioned in opposition to the thrust runner 112 and is supported with a pivot receiving member 113, with the bearing frame 115 being engaged with a rotative stopping member 114 so as to not rotate, and a thrust bearing 116 mounted to the bearing frame 115.

Figure 13:
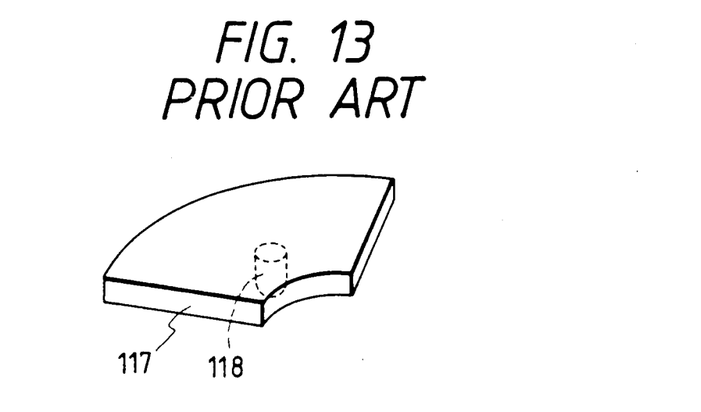
FIG. 13 is a perspective view of a pad of a thrust bearing of the submersible thrust bearing apparatus shown in FIG. 12.

The thrust bearing 116 includes a plurality of sector form pads 117, positioned on the bearing frame 115 at a circumferential direction, with each of the pads 117 including a pin 18 at a central bottom portion thereof as shown in FIG. 13. The pin 118 extends into a hole 119 formed in the bearing frame 115 and can tilt and rotate with the bearing frame 115.

When the rotative shaft 101 rotates, the thrust runner 112 rotates also and, water flow is caused by the rotation of the rotative shaft 101, with the pad 117 of the thrust bearing 116 tilting at the circumferential direction against the thrust runner 112 due to the water flow. By virtue of the tilting of the pad 117, the tip of the pad 117 becomes higher at the rotation direction side against the thrust runner 112.

As a result, a clearance is formed at a space between the sliding face being formed on the lower surface of the thrust runner 112 and the sliding face formed on the upper surface of each pad 117. The clearance has a tapering wedge-shaped form at the rotation direction against the thrust runner 112. The wedge-shaped form clearance results in a dynamic pressure by the wedge effect and further forms water film therein, with all of thrust load (axial direction load) being then supported by the water film.

Accordingly, when the thrust load becomes large, the tilting degree of the pad 117 becomes small then the sliding face formed on the thrust runner 112 closely adheres to the sliding face formed on the pad 117.

As a result, the wedge-shaped form clearance becomes narrower, the occurrence of dynamic pressure by the wedge effect becomes smaller, and accordingly, hardly any water film is formed between the space of the sliding face formed on the thrust runner 112 and the sliding face formed on the pad 117.

This causes a large temperature increase in the space of the sliding faces, and the sliding face of the pad 117 is convexly deformed by the temperature differential caused between the temperature of the upper face of the pad 117 and the temperature of the bottom surface of the pad 117. Further, the sliding surface of the pad 117 is also convexly deformed by the thrust load itself.

The convex load deformation at the sliding face of the pad 17 further narrows the wedge-shaped form clearance, making even more difficult to form the water film. As a result, it becomes to be impossible to support the thrust load by the thrust bearing apparatus 107.

Therefore, to support the high thrust load it is necessary to provide a large submersible thrust bearing apparatus, however such approach requires high cost.

SUMMARY OF THE INVENTION

An object of the present invention is to provide a submersible thrust bearing apparatus having an increased load capacity.

Another object of the present invention is to provide a submersible thrust bearing apparatus which can be used even at high load.

A further object of the present invention is to provide a submersible thrust bearing apparatus wherein an occurrence of dynamic pressure by wedge effect and a formation of water film can be assured even with a large thrust load.

A still further object of the present invention is to provide a submersible thrust bearing apparatus wherein a temperature increase between a sliding face of a thrust runner and a sliding face of a thrust bearing can be minimized.

Yet another object of the present invention is to provide a submersible thrust bearing apparatus wherein a stable bearing performance can be obtained.

According to the present invention, a submersible thrust bearing apparatus includes a rotative shaft, a shaft collar fixed to the rotative shaft, a ring-like form thrust runner mounted on the shaft collar, a thrust bearing for supporting sliding the thrust runner, and a bearing frame on which the thrust runner, and a bearing frame on which the thrust bearing is mounted.

The thrust bearing includes a ring-like form plate body, and a plurality of rib members provided on the ring-like form plate body of the thrust bearing, with the rib members causing a difference in an amount of load deformation in a circumferential direction according to thrust load and further generate a wedge-shaped form clearance between a sliding face of the ring-like form plate body of the thrust bearing and a sliding face of the thrust runner.

The thrust bearing of the present invention may be provided with a ring-like form plate body, and plurality of rib members on the thrust runner, with the rib members causing a difference in load deformation in an amount of a circumferential direction according to thrust load and further generate a wedge-shaped form clearance between a sliding face of the ring-like form plate body of the thrust bearing and a sliding face of the thrust runner.

According to the present invention, since the wedge-shaped form clearance is formed by utilizing the load deformation, even when the thrust load becomes large at high load value, the wedge-shaped form clearance does not become narrow. Therefore, the occurrence of dynamic pressure by the wedge effect and the formation of water film can be assured, and the temperature increase between a sliding face of the thrust runner and a sliding face of the thrust bearing can be restrained.

According to the submersible thrust bearing apparatus of the present invention, the occurrence of dynamic pressure by the wedge effect and the formation of water film can be insured even when the thrust load becomes large, and the temperature increase in the space formed between sliding face of the thrust runner and the sliding face of the thrust bearing can be restrained, whereby an increase in the load capacity of the submersible thrust bearing apparatus can be attained and it can be used even at high load.

When in case of the load capacity of the submersible thrust bearing apparatus is same one with the conventional submersible thrust bearing apparatus, the miniaturizing of the submersible thrust bearing apparatus can be attained and the manufacturing cost of the submersible thrust bearing apparatus can be reduced.

Further since the thrust bearing of the submersible thrust bearing apparatus is made with one body structure, the dimension accuracy in the height direction of the thrust bearing can be obtained easily, and the local touch disappears, thereby a stable bearing performance of the submersible thrust bearing apparatus can be obtained. Since the damage by the wear is reduced, a long service life of the submersible thrust bearing apparatus can also be attained.

Figure 1:
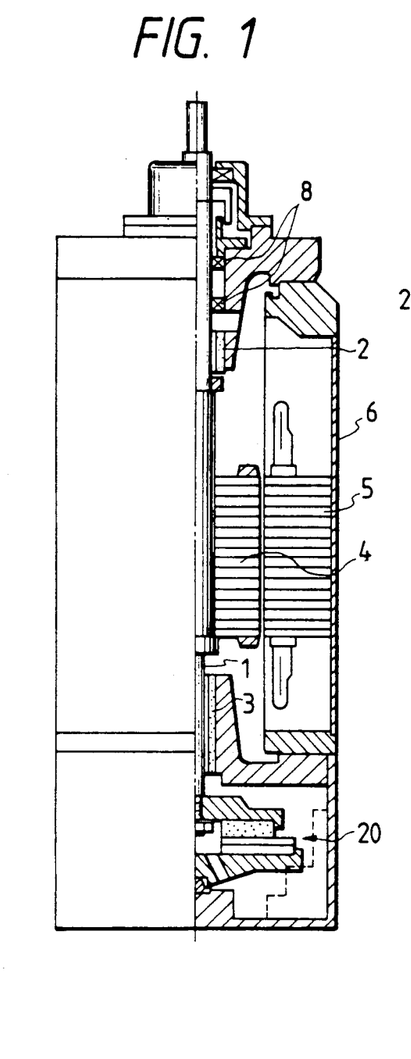
FIG. 1 is a vertical cross-sectional view of a submersible motor in which a submersible thrust bearing apparatus according to one embodiment of the present invention is incorporated.

Referring now to the drawings wherein like reference numerals are used throughout the various views to designate like parts and, more particularly, to FIG. 1, according to this Figure, a submersible well pump includes a rotative shaft having an upper portion supported by a radial bearing 2, with a lower portion thereof being supported by a radial bearing 3. A rotor 4 is supported by the rotative shaft 1 and a stator 5 is arranged around the rotor 4, with the stator 5 being provided within an inner side portion of the main body 6. A thrust bearing apparatus generally designated by the reference numeral 20 is arranged at a lower end portion of the rotative shaft 1, with a pump portion (not shown) being arranged at and connected to the upper portion of the rotative shaft 1. All of the thrust or axially directed load is absorbed by the submersible thrust bearing apparatus 20.

Water fills an interior portion of the motor main body 6 including a portion in which the submersible thrust bearing apparatus 20 is positioned. A sealing member 8 is provided at a surrounding portion of the upper end portion of the rotative shaft 1 so as to check the outflow of water. The submersible thrust bearing apparatus 20 performs a bearing function in which this water works as lubricating liquid.

Figure 2:
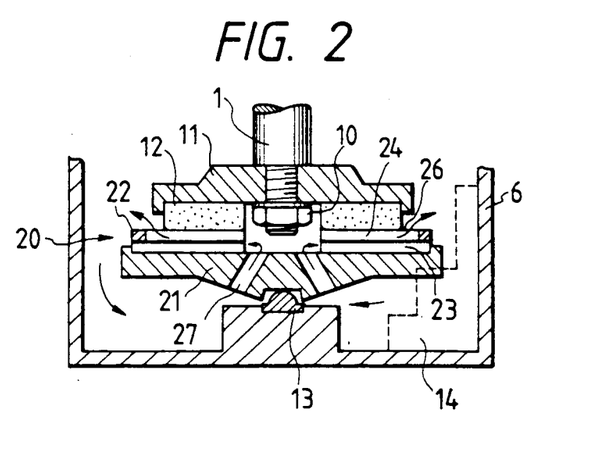
FIG. 2 is an enlarged cross-sectional detail view of a submersible thrust bearing apparatus of FIG. 1.

As shown in FIG. 2, the shaft collar 11 is fixed to the rotative shaft 1 with the hexagonal nut 10, and the ring-like form thrust runner 12, fashioned of a baked carbon material is inserted into a recessed portion of the shaft collar 11. The pivot receiving member 13 is mounted to the bottom portion of the motor main body 6 so as to receive the bearing frame 21, and the rotative stopping member 14 is mounted to the inner side portion of the motor main body 6.

The submersible thrust bearing apparatus 20 comprises the bearing frame 21, supported by the pivot receiving member 13, and engageable with the rotative stopping member 14 so as to not rotate the thrust bearing 22. The thrust bearing 22 is mounted to the bearing frame 21, which is positioned so as to opposite to the thrust runner 12, and supports a sliding of the thrust runner 12.

Figure 3:
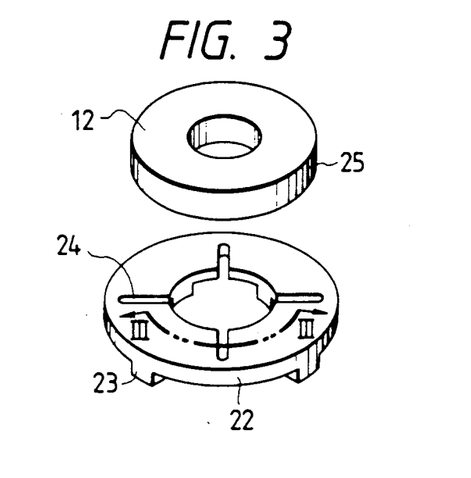
FIG. 3 is a perspective view of a thrust runner and a thrust bearing of a submersible thrust bearing apparatus of the present invention.

As shown in FIG. 3, the thrust bearing 22 includes a ring-like form plate body having a plurality of ribs 23 are provided on a bottom portion thereof and facing the bearing frame 21. Each of ribs 23 extends in a radial direction at the bottom portion of the ring-like form plate body and has a predetermined width, respectively.

A plurality of passages (slits) for introducing the lubricating water are formed at the sliding face of the ring-like form plate body against the thrust runner 12 and extend in the radial direction of the ring-like form plate body. Each of the slits 24 is positioned substantially in the middle of the adjacent two ribs 23 and are open at the inner diameter end portion of the ring-like form plate body and closed at the outer diameter end portion of the ring-like form plate body.

In other words, in spite of the provision of the passages of slits 24, the ring-like form plate body of the thrust bearing 22 is connected with the outer peripheral portion 26 formed between the outer diameter end portion of the slit 24 and the outer diameter surface 25 of the thrust member 12. The outer end diameter portion of the slits 24 respectively extend the outer peripheral portion 26 of the ring-like form plate body beyond the outer surface 25 of the thrust runner 12.

A plurality of communicating holes 27 for the lubricating water are formed within the bearing frame 21 and are opened toward the upper central surface of the ring-like form plate body of the thrust bearing 22.

In the above structure of the submersible thrust bearing apparatus 20 when the thrust load (axial direction load) acts on the thrust bearing 22, the difference in the amount of deformation amount is caused at the ring-like form plate body in the circumferential direction because thickness differs in a portion where the ribs 23 are and in a portion where the ribs 23 are not provided.

The load deformation on the ring-like form plate body of the thrust bearing 22 becomes smaller in the sliding face portion of the ring-like form plate body at the vicinity of the ribs 23. The load deformation becomes larger in the sliding face portion except for the vicinity of the ribs 23.

The load deformation at the sliding face of the ring-like form plate body in the vicinity of the slits 24 becomes larger because the ring-like form plate body having the sliding face portion in the vicinity of the slits 24 has a thickness less than a thickness of the rib 23 and also because of the existence of the slits 24.

By virtue of the above noted difference in the amount of deformation, the wedge-shaped form clearance occurs at the space between formed on the sliding face of the lower surface of the thrust runner 12 and the sliding face of the upper surface of the ring-like form plate body of the thrust bearing 22.

Namely, the rib 23 causes the difference in the amount of deformation at the circumferential direction of the thrust bearing 22 according to the thrust load and also works as clearance generating member in which the wedge-shaped form clearance is generated in the space between the sliding face of the thrust runner 12 and the sliding face of the thrust bearing 22. Therefore, the dynamic pressure occurs at the clearance portion of the thrust bearing apparatus 22 during the rotation of the rotative shaft 1.

Figure 4:
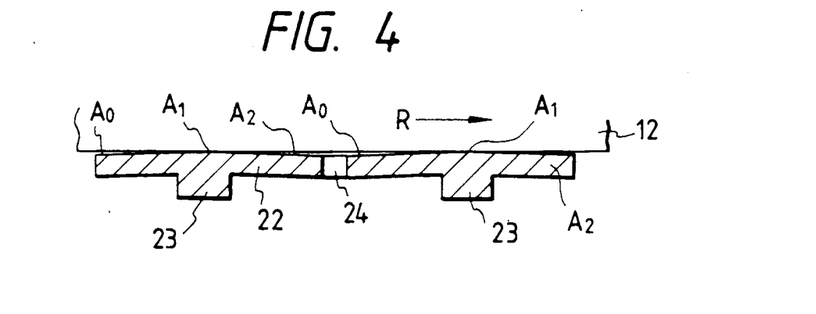
FIG. 4 is a developmental view of a cross-section taken along the line IV—IV in FIG. 3.

As shown in FIG. 4, there is barely any load deformation at a portion $A_1$ of the sliding face of the ring-like form plate body of the thrust bearing 22 positioned above the rib 23; however, in the other portions $A_0$ and $A_2$ of the sliding face of the ring-like form plate body of the thrust bearing 22, an amount of load deformation is caused which is proportional to the amount of thrust load.

At the portion $A_0$, the wedge-shaped clearance tapering in the rotational direction R of the thrust runner 12, is formed at the space between the sliding face of the thrust runner 12 and the sliding face of the ring-like form plate body of the thrust bearing 22. Therefore, the dynamic pressure occurs at a space between the portion $A_0$ of the thrust bearing 22 and the sliding face of the thrust runner 12 during the rotation of the rotative shaft 1.

At the portion $A_2$ the clearance widening toward the end in the rotational direction R of the thrust runner 12 is formed at the space between the sliding face and the sliding face of the ring-like form plate body of the thrust bearing 22. Therefore, the dynamic pressure does not occur at a space between the portion of the ring-like form plate body of the thrust bearing 22 and the sliding face of the thrust runner 12 during the rotation of the rotative shaft 1.

Besides, in comparison with the inner peripheral portion and the outer peripheral portion of the thrust bearing 22, the outer peripheral portion of the thrust bearing 22 deforms easily because the distance between adjacent two ribs 23 is longer than that of the inner peripheral portion of the thrust bearing 22. However at the outer peripheral portion of the thrust bearing 22, the ring-like form plate body is connected for want of the slit 24.

Accordingly, a greater load deformation than necessary be prevented therefrom, and as a result, the amount of the load deformation can be maintained to be about the same deformation amount value. Therefore, escape of dynamic pressure toward the outer side portion of the thrust bearing 22 at the radial direction due to the excessive load deformation of the outer peripheral portion of the thrust bearing 22 can be prevented.

Accordingly, the dynamic pressure, which occurs the wedge-shaped form clearance formed at the portion $A_0$ can be utilized effectively so as to form the water film for supporting the thrust load. This wedge-shaped form clearance at the portion $A_0$ is formed by utilization of the load deformation. Therefore, even if the thrust load is high, the wedge-shaped form clearance does not become to be narrow.

The occurrence of dynamic pressure by the wedge effect and the function of water film formation can be maintained in the above described.

The temperature increase in the space of sliding face of the thrust runner 12 and the sliding face of the thrust bearing 22 can be restrained due to this function.

Accordingly, according to the above described embodiment of the present invention, the submersible thrust bearing apparatus 20 can be used even at high load condition, thereby large load capacity of the submersible thrust bearing apparatus can be obtained therein. As a result of the provision of the plurality of slits 24 due to the pumping function of the thrust runner 12, the lubricating water is sucked through the communicating hole 27 of the bearing frame 21 and passes through the slits 24 from the bottom portion of the bearing frame 21 and water flow, which flows out forcibly through the outer peripheral portion 26 of the thrust bearing 22, can be caused therein.

In other words, the slits 24 of the thrust bearing 22 function as passage members for passing the lubricating water toward the space between the sliding face of the thrust runner 12 and the sliding face of the thrust bearing 22 from the bottom portion of the bearing frame 21.

Accordingly, the outer peripheral portion 26 of the thrust bearing 22 is cooled by the lubricating water which flows out from the outer peripheral portion 26 of the thrust bearing 22, thereby heat dissipation from the outer peripheral portion 26 of the thrust bearing 22 can be improved.

As a result, the temperature increased at the sliding face of the ring-like form plate body of the thrust bearing 22 can be further effectively restrained, and the occurrence of the convexity form thermal deformation can be dissolved substantially. This makes high load supporting by the submersible thrust bearing apparatus 20 possible and a stable bearing function by the submersible thrust bearing apparatus 20 can be obtained even at high speed and at high load condition.

Figure 5:
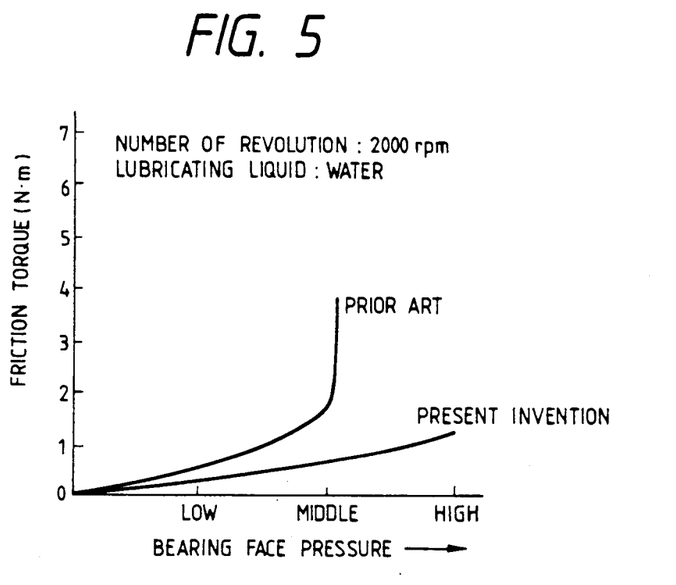
FIG. 5 is a graphical illustration of thrust bearing performance according to the present invention compared with the conventional thrust bearing apparatus.

FIG. 5 graphically depicts two comparative examples in which the friction torque in the submersible thrust bearing apparatus 20 in the above described embodiment of the present invention shown in FIG. 2 and the friction torque in the conventional thrust bearing apparatus are compared under the condition at the thrust bearing having the substantial same dimension size.

The bearing performance of the submersible thrust bearing apparatus can be estimated by the stability of friction torque which is proportional to the change of the bearing face pressure. As shown in FIG. 5, in the conventional submersible thrust bearing apparatus, the friction torque increases rapidly at the middle load degree.

Contrary to the conventional submersible thrust bearing apparatus, in the described embodiment of the present invention, the stable friction torque is maintained even at the extent of high load value. Therefore, it has been experimentally confirmed that the submersible thrust bearing apparatus 20 according to the above described embodiment of the present invention can provide an excellent bearing performance.

Further according to the above embodiment of the present invention, since it is possible to take the burden load per unit area large, it is also possible to reduce the size of the submersible thrust bearing apparatus in comparison with the conventional submersible thrust bearing apparatus under the same thrust load.

Accompanying with the miniaturization of the submersible thrust bearing apparatus 20, as well as the material and the manufacturing cost can be saved, and the reduction of the stirring loss at the thrust bearing 22 can be attained.

Further, the thrust bearing 22 of the above described embodiment according to the present invention has a unified construction, in comparison with the conventional thrust bearing including a plurality of pads, and the processing of the inside surface and the outside surface of the thrust bearing 22 can be carried out at one time, and also dimensional accuracy at the height direction can be easily given.

Accordingly, the local touch of the thrust bearing 22 under the rotation of the rotative shaft 1 can disappear, the stable bearing performance can be obtained from the beginning, thereby the reliableness of the submersible thrust bearing apparatus 20 can be improved. As the local touch of the thrust bearing 22 disappears, the damage of the thrust bearing 22 can be prevented, and the long service life of the submersible thrust bearing apparatus 20 can be expected.

Further, by virtue of the fact that the thrust bearing 22 can be made in an unified construction, in comparison with the conventional submersible thrust bearing apparatus including a plurality of pads, the manufacturing accuracy for constructing the thrust bearing 22 can be obtained easily.

In the above described embodiment of the present invention, the outer peripheral portion 26 of the ring-like form plate body of the thrust bearing 22 is positioned at the outer side portion from the outer diameter surface 25 of the thrust runner 12. This structure of the thrust bearing 22 is adopted by following reason.

If the outer diameter end portion of the slit 24 provided on the thrust bearing 22 is located at the same position or at inside of the outer diameter surface 25 of the thrust runner 12, the flow-out amount of the lubricating water by the pumping action of the thrust runner 12 is reduced, and the cooling in the vicinity of the the outer peripheral portion of the sliding face of the thrust runner 12 is insufficient.

Further, in the above described embodiment of the present invention, taking the reverse rotation of the rotative shaft 1 into consideration, the position of the slit 24 provided on the thrust bearing 22 is set to be in the middle position of the adjacent two ribs 23. However the position of the slit 24 of the thrust bearing 22 may be determined according to the rotational direction of the rotative shaft 1, therefore the position of the slit 24 is not limited in the middle position of the adjacent two ribs 23. When the rotative shaft 1 rotates only in one direction, the slit 24 arranged between the adjacent two ribs 23 is remotely positioned toward the leading rib 23 side.

Further, the inner diameter end portion of the slit 24 is opened, however, each slit 24 of the thrust bearing 22 the slit 24 maybe opened at the outer diameter end portion thereof and is closed at the inner diameter end portion thereof.

Further in the above described embodiment, the width of the rib 23 in the radial direction is the same at any portion on the ring-like form plate body of the thrust bearing 22. However, the width of the rib 23 in the radial direction may be determined according to the thrust load condition.

Figure 6:
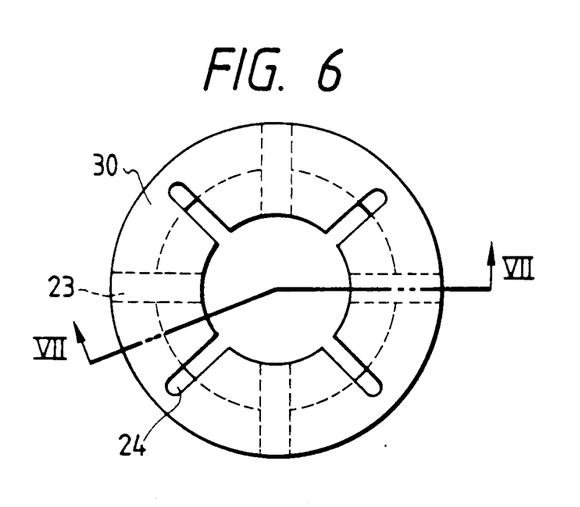
FIG. 6 is a plan view of a thrust bearing according to another embodiment of present invention.

In FIG. 6, the load deformation is accommodated in the circumferential direction and also in the radial direction of the thrust bearing, thereby the load capacity of the submersible thrust bearing apparatus can be improved even more than the embodiment of FIG. 2.

Namely, in the embodiment of FIG. 2, the plate width of the ring-like form plate body of the thrust bearing 22 is the same in the radical direction, whereas in this embodiment of the present invention FIG. 6, the plate width of the ring-like form plate body of the thrust bearing 30 is changed with two steps in the radial direction of the thrust bearing 30.

Figure 7:
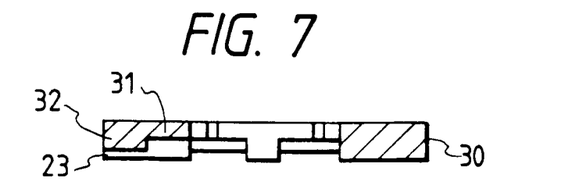
FIG. 7 is a cross-sectional view taken along the line VII—VII in FIG. 6.

As shown in FIG. 7, at the portion in which no rib is provided the plate width of the ring-like form plate body of the thrust bearing 30 comprises an inner peripheral portion 31 having a thin plate width and an outer peripheral portion 32 having a thick plate width.

In FIG. 7, when the thrust load acts, the load deformation in the radial direction of the thrust bearing 30 is similar to that of shown in FIG. 4. In this case, the wedge-shaped form clearance is formed with a tapering shape in the outside portion of the radial direction of the thrust bearing 30.

Accordingly, the dynamic pressure occurs by the wedge effect in the radial direction of the thrust bearing 30 at the space between the thrust runner and the thrust bearing 30. As the dynamic pressure is added, the improvement in load capacity of the submersible thrust bearing apparatus can be expected in embodiment of FIG. 6 and 7.

In the above described embodiments of the present invention, as the passage member for passing the lubricating water, a plurality of slits 24 are formed in the thrust bearing 30. However the slits 24 may be provided in the thrust runner side.

Figure 8:
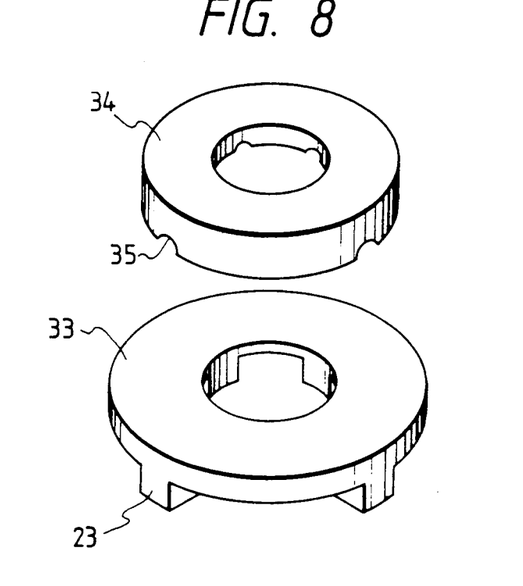
FIG. 8 is a perspective view of a thrust runner and a thrust bearing of a submersible thrust bearing apparatus according to a further embodiment of the present invention.

In FIG. 8, a plurality of grooves 35 are provided in at the sliding face side of the thrust runner 34 for forming passages for the lubricating water, with the thrust bearing 33 included an upper plane sliding face having no slit thereon. A plurality of ribs 23 are provided on the thrust bearing 33 at the bottom portion thereof so as to be disposed in opposition to the bearing frame.

Each groove 35 provided on the thrust runner 34 extends and penetrates from the inner peripheral surface to the outer peripheral surface of the sliding face of the thrust runner 34 in the radial direction. In such a manner, the grooves 35 result in a cooling performance similar to the slits 24.

In the embodiment of FIG. 8, it is easy to collect the foreign matter in the grooves 35 upon rotation of the rotative shaft; however the foreign matter is distributed out toward the outer diameter of the thrust runner 34.

Accordingly, abrasiveness due to the presence of foreign matter in the space between the sliding face of the thrust runner 34 and the sliding face of the thrust bearing 33 is minimized so that, the damage on the sliding face of the thrust runner 34 and the sliding face of the thrust bearing 33 can be prevented, thereby insuring a stable bearing performance of the submersible thrust bearing apparatus over a long service life.

In the above embodiment of FIG. 8 a plurality of ribs 23 are provided on the bottom portion of the thrust bearing 33. However the ribs 23 may be formed at the bearing frame side as shown in FIG. 9 where in a plurality of ribs 38 are formed on an upper portion of the bearing frame 37 not provided on the thrust bearing 36 side.

Further the ring-like form collar 39 for positioning the thrust bearing 36 with the bearing frame 37 is formed in a body on the thrust bearing 36 at the outer diameter end portion thereof. A plurality of slits 40 are provided on the thrust bearing 36 and extend throughout toward the outer diameter end surface of the thrust bearing 36 including a portion of the collar 39.

A plurality of passages for the lubricating water are formed between the adjacent ribs 38 which permit lubricating water to pass therethrough, with the lubricating water being directed to a space between the sliding face of the thrust runner 12 and the sliding face of the thrust bearing 36.

Figure 9:
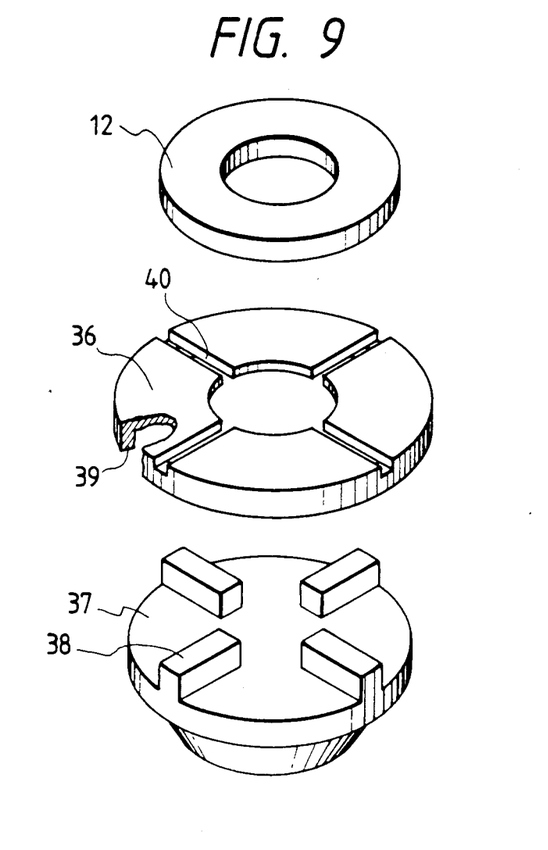
FIG. 9 is a perspective view of a thrust runner, a thrust bearing and a bearing frame of a submersible thrust bearing apparatus according to a still further embodiment of the present invention.

In the embodiment of FIG. 9 the thrust bearing 36 causes the difference in the amount of the load deformation at each place whether the rib 38 is or is not provided whereby the wedge-shaped form clearance is formed in the sliding face of the thrust runner 12 and the sliding face of the thrust bearing 36 in the circumferential direction.

The ribs 38 produce the difference in the amount of the load deformation in the radial direction and play a role as clearance generating member for generating the wedge-shaped form clearance in the space formed between the sliding face of the thrust runner 12 and the sliding face of the thrust bearing 36.

Accordingly, with the embodiment of FIG. 9, the high thrust load can be supported and the load capacity of the submersible thrust bearing apparatus can be improved similar to the embodiment of FIG. 2.

The bearing frame 37 is manufactured, for example, by a precision casting processing, so that it is possible to mass produce the bearing frame 37, and even a bearing frame 37 having a plurality of ribs 38 can be manufactured at low price similar to the above described embodiments. Furthermore, since the ring-like form collar 39 is provided at the outer diameter end portion of the thrust bearing 36, the positioning of the thrust bearing 36 with the bearing frame 37 can be attained easily and the assembling of the thrust bearing 36 with the bearing frame 37 can be carried out in a simple manner.

Figure 10:
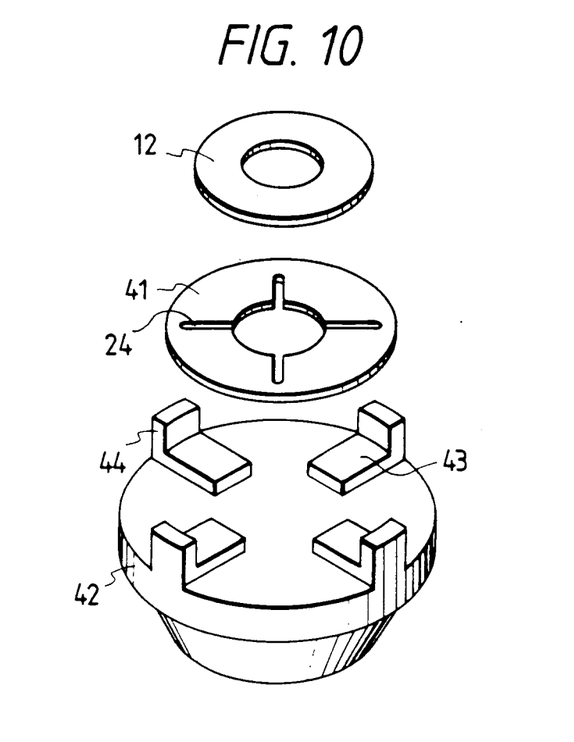
FIG. 10 is a perspective view of a thrust runner, a thrust bearing and a bearing frame of a submersible thrust bearing apparatus according to yet another embodiment of the present invention.

The embodiment of FIG. 10 has a structure similar to that of the embodiment of FIG. 9, however, in FIG. 10, the collar for positioning with the bearing frame 42 is not provided on the thrust bearing 41, and a plurality of ribs 43 having a step portion 44 of the bearing frame 43 are formed with a stepped shape at the outer peripheral portion thereof, with the positioning of the thrust bearing 41 within the bearing frame 42 being determined by the step portion 44 of the rib 43.

In FIG. 10, the operation and the effect similar to the collar 39 provided on the thrust bearing 36 of FIG. 9 can be obtained. The thrust bearing 41 is of a simple structure, that is, the ring-like form plate body of the thrust bearing 41 has a plurality of slits 24 thereon, whereby a reduction of the manufacturing cost of the thrust bearing 41 can be realized.

Figure 11:
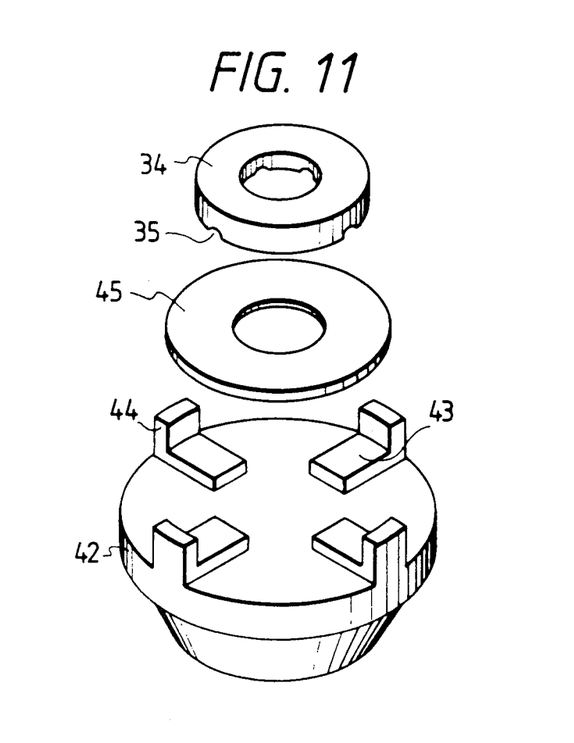
FIG. 11 is a perspective view of a thrust runner, a thrust bearing and a bearing frame of a submersible thrust bearing apparatus according to a further embodiment of the present invention.

The embodiment of FIG. 11 adopts the structure of the embodiment of FIG. 8 as a lubricating water passage member of the embodiment shown in FIG. 10. In FIG. 11 the thrust bearing 45 has no slit thereon, but the thrust bearing 45 is made of the ring-like form plate body having flat surface shape on both surfaces thereof. A plurality of grooves 35 are provided on the thrust runner 34 side in the radial direction thereof so as to be disposed in opposition to the thrust bearing 45.

According to the embodiment of FIG. 11, the operation and the effect similar to the above described embodiments can be obtained furthermore according to embodiment of FIG. 11, since the thrust bearing 45 is a simple shaped ring-like form plate body, the manufacturing cost of the thrust bearing 45 can be further reduced.

In all of the above described embodiments, the rib members are provided on the thrust bearing side, and the wedge-shaped form clearance is formed by the load deformation of the thrust bearing. However the rib members may be provided on the thrust runner side, and then thrust runner causes to the load deformation.

In above described constructions, the wedge-shaped form clearance can be formed between the sliding face of the thrust bearing and the sliding face of the thrust runner, whereby the operation and the effect similar to the thrust bearing having the rib members thereon can be obtained.

In the above described embodiments, so as to form the wedge-shaped form clearance between the sliding face of the thrust bearing and the sliding face of the thrust runner, the structure utilizing the load deformation is adopted by the provision of the rib members.

In the application of the load deformation in accordance with the present invention, when the thrust load becomes large and the load deformation occurs in accordance with that load amount, a sufficient dynamic pressure by the wedge effect can be expected. Furthermore since the processing for the wedge-shaped form at the sliding face is unnecessary, low manufacturing cost can be attained. Moreover since the sliding face of the thrust runner or the thrust bearing is uniformly worn a stable wedge effect can be obtained without the effects of wear of the sliding face.

We claim:

1. A submersible thrust bearing apparatus comprising:
    a rotative shaft; a shaft collar fixed to said rotative shaft;
    a thrust runner mounted on said shaft collar, said thrust runner having a ring-like plate body with a substantially flat planar upper surface and a substantially flat planar bottom surface;
    a thrust bearing means for slidably supporting said thrust runner, said thrust bearing means including a ring-like plate body with a substantially flat planar upper surface and a plurality of slits respectively extending in a radial direction of said plate body of said thrust bearing means and extending through an entire thickness of said thrust bearing means, each of said plurality of slits being opened at a radially inner end portion thereof and closed at a radially outer portion thereof, and a plurality of rib members integrally provided on a bottom surface of said plate body of said thrust bearing means;

a bearing frame means separate from and mounted on said thrust bearing means;

said plurality of rib members causing a difference in an amount of load deformation in a circumferential direction in accordance with a thrust load and generating a wedge-shaped clearance between a sliding face of said thrust bearing means formed at the upper surface thereof and a sliding face of said thrust runner formed at the bottom surface thereof, each of said plurality of rib members has the same width and thickness in the radial direction of said thrust bearing means and extends throughout substantially linearly from an inner end portion of said thrust bearing means to an outer end portion thereof, each of said plurality of rib members is positioned substantially at a middle area between two adjacent slits and is arranged to face an upper surface of said bearing frame means; and wherein said plurality of rib members generates said wedge-shaped clearance between an outlet portion of each of said plurality of slits and an inlet portion of an adjacent rib member, and the amount of load deformation in the plate body is maintained substantially the same as a value of the amount of load deformation in the radial direction of said plate body of said thrust bearing means.

2. A submersible thrust bearing apparatus according to claim 1, wherein an outer diameter portion of each of said plurality of slits is positioned at an outer side from an outer diameter portion of said thrust runner.

3. A submersible thrust bearing apparatus according to claim 1, wherein the plate body of said thrust bearing means includes a central opening having a diameter which is substantially the same as a diameter of a central opening of said thrust runner.

4. A submersible thrust bearing apparatus according to claim 1, wherein said plurality of rib members are disposed symmetrically on the bottom surface of said plate body of said thrust bearing means, and said plurality of slits are disposed symmetrically on said thrust bearing means.

5. A submersible thrust bearing apparatus according to claim 1, wherein a plurality of communicating hole means are provided on said bearing frame means for supplying a lubricant to a space between the sliding face of said thrust bearing means and the sliding face of said thrust runner.

6. A submersible thrust bearing apparatus comprising:
a rotative shaft;
a shaft collar fixed to said rotative shaft;
a thrust runner mounted on said shaft collar, said thrust runner having a ring-like plate body with a substantially flat planar upper surface and a substantially flat planar bottom surface;
a thrust bearing means for slidably supporting said thrust runner; and
a bearing frame separate from said thrust bearing means having said thrust bearing means mounted thereon; and wherein said thrust bearing means comprises a ring-like plate body with a substantially flat planar upper surface, a plurality of rib members integrally provided on a bottom surface said ring-like plate body of said thrust bearing means, a plurality of radially extending slits provided only on said thrust bearing means and having a radial length substantially equal to a radial length of the thrust runner, and a wedge-shaped clearance formed between a sliding face of said thrust bearing means formed at the upper surface thereof and a sliding face of said thrust runner formed at the bottom surface therof, each of said plurality of rib members is positioned at a substantially flat planar bottom surface of said ring-like plate body of said thrust bearing means facing said thrust bearing means and extending in a radial direction of said ring-like plate body of said thrust bearing means, said plurality of slits extend through an entire thickness of said thrust bearing means and are disposed symmetrically on the ring-like plate body of said thrust bearing means and are open at an inner end portion of the ring-like plate body of said thrust bearing means and closed at the outer portion of said ring-like plate body of said thrust bearing means, said plurality of rib members are disposed symmetrically on the bottom surface of said plate body of said thrust bearing means and have the same width and thickness in the radial direction and are respectively positioned substantially at a middle area between two adjacent slits of said plurality of slits; and wherein said plurality of rib members cause a difference in an amount of load deformation in a circumferential direction in accordance with a thrust load and generate said wedge-shaped clearance between the sliding face of said thrust bearing means and the sliding face of said thrust runner and generate said wedge-shaped clearance between an outlet portion of each of said plurality of slits of said thrust bearing means and an inlet portion of adjacent rib members of said thrust bearing means, and an amount of load deformation in said ring-like plate body of said thrust bearing means is maintained at the same value as the amount of deformation in a radial direction of said ring-like plate body of said thrust bearing means.

7. A submersible thrust bearing apparatus according to claim 6, wherein said ring-like plate body of said thrust bearing means has a uniform thickness in a radial direction, and each of said plurality of slits has the same configuration.

8. A submersible thrust bearing apparatus according to claim 7, wherein each of said plurality of rib members extends substantially linearly from the inner end portion of said plate body of said thrust bearing means to an outer end portion of said plate body of said thrust bearing means.

* * * * *